United States Patent
Taylor et al.

(10) Patent No.: US 10,789,353 B1
(45) Date of Patent: Sep. 29, 2020

(54) SYSTEM AND METHOD FOR AUGMENTED REALITY AUTHENTICATION OF A USER

(71) Applicant: Capital One Services, LLC, McLean, VA (US)

(72) Inventors: Kenneth Taylor, Champaign, IL (US); Fardin Abdi Taghi Abad, Champaign, IL (US); Jeremy Goodsitt, Champaign, IL (US); Austin Walters, Savoy, IL (US); Vincent Pham, Champaign, IL (US); Anh Truong, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/545,610

(22) Filed: Aug. 20, 2019

(51) Int. Cl.
  G06F 21/00 (2013.01)
  G06F 21/36 (2013.01)
  G06F 21/34 (2013.01)
  G06T 19/00 (2011.01)

(52) U.S. Cl.
  CPC ............. *G06F 21/36* (2013.01); *G06F 21/34* (2013.01); *G06T 19/006* (2013.01)

(58) Field of Classification Search
  CPC .......... G06F 21/36; G06F 21/34; G06F 21/31; G06F 3/017; G06T 19/006; H04L 63/08; H04L 63/0853; H04L 63/102; H04L 2463/082; H04W 12/06
  See application file for complete search history.

(56) References Cited

U.S. PATENT DOCUMENTS

| | | |
|---|---|---|
| 6,012,039 A | 1/2000 | Hoffman et al. |
| 7,273,168 B2 | 9/2007 | Linlor |
| 8,630,932 B1 | 1/2014 | Lapsley et al. |
| 2002/0073416 A1 | 6/2002 | Ramsey Catan |
| 2003/0001006 A1 | 1/2003 | Lee |
| 2005/0199709 A1 | 9/2005 | Linlor |
| 2006/0248005 A1 | 11/2006 | Moore |
| 2009/0121012 A1 | 5/2009 | Beemer et al. |
| 2009/0283582 A1 | 11/2009 | Doan et al. |
| 2013/0148024 A1 | 6/2013 | Shin et al. |
| 2013/0246264 A1 | 9/2013 | Lucas et al. |
| 2013/0275309 A1 | 10/2013 | Kwong |
| 2014/0076965 A1 | 3/2014 | Becorest et al. |
| 2014/0101047 A1 | 4/2014 | Gardiner et al. |
| 2014/0125574 A1* | 5/2014 | Scavezze ............... G06F 21/31 345/156 |
| 2014/0222596 A1 | 8/2014 | S |
| 2014/0304055 A1 | 10/2014 | Faith |
| 2014/0304132 A1 | 10/2014 | McHugh et al. |
| 2014/0310174 A1 | 10/2014 | Heeter |
| 2015/0081550 A1 | 3/2015 | Priebatsch et al. |
| 2015/0089615 A1* | 3/2015 | Krawczyk ............... G06F 16/93 726/7 |
| 2017/0061438 A1 | 3/2017 | Patel |
| 2017/0068961 A1 | 3/2017 | Cox |
| 2017/0116602 A1 | 4/2017 | Chauhan |

(Continued)

*Primary Examiner* — Yogesh Paliwal
(74) *Attorney, Agent, or Firm* — Hunton Andrews Kurth LLP

(57) ABSTRACT

Systems and methods for augmented reality authentication of a user are described, including authenticating a user by presenting the user with augmented reality authentication challenges, evaluating the user's response, and using the response to authenticate the user.

20 Claims, 7 Drawing Sheets

(56) References Cited

U.S. PATENT DOCUMENTS

2017/0186011 A1 6/2017 Lieberman et al.
2017/0228735 A1 8/2017 Glaros
2018/0349884 A1 12/2018 Sharma et al.

\* cited by examiner

SYSTEM AND METHOD FOR AUGMENTED REALITY AUTHENTICATION OF A USER

FIELD OF THE INVENTION

The present invention relates to authenticating a user by presenting augmented reality security challenges to a user, evaluating the user's response, and using the response to authenticate the user.

BACKGROUND

When users conduct business or participate in activities in person, it can be relatively straightforward to authenticate the user, to verify that the user is the person they are claiming to be. For interactions occurring online, where the user or other participants are not physically present, and are participating using a personal electronic device, authenticating the user can create more difficult challenges.

There are various methods of user authentication for such circumstances. A user may receive a notification or SMS text message on a personal electronic device known to be associated with that user, and may be asked to respond to confirm the user's authenticity. A user may be asked to submit biometric information, such as a fingerprint, to a personal electronic device, and have that biometric information evaluated before the user is permitted to proceed. A user may be asked to provide information that has been previously associated with the user, such as a password, birth date, prior address, or other personal information that provides confidence in the user's authenticity.

Known user authentication methods are limited, and do not create sufficient confidence in the user's authenticity. If a false user is using a device, that false user may have obtained the device through theft or fraud, and may have bypassed the user authentication strategies of the device. For example, the false user may have illegitimately identified the user's personal passwords or information, possibly by hacking into database of passwords, or by monitoring the user's activity on a device to record keystrokes or other user input. As a further example, the false user may have forged a fingerprint capable of circumventing a fingerprint identification functionality of the device. The variety of devices available to users means that such devices have varying levels of security functionality, leaving many users with limited ways to authenticate a transaction. In addition to being susceptible to fraud, authenticating the user through conventional methods can be cumbersome when carried out on a mobile device.

There is a need for systems and methods that create confidence in a user's authenticity, by presenting security challenges in a manner that is effective, useful, and simple to operate.

SUMMARY

The following systems and methods provide for improved user authentication, for users participating in activities via personal electronic devices, by providing for a user to interact with augmented reality (AR) on their personal electronic device. With the inclusion of AR technology to the user authentication process, the approach to user authentication can be greatly expanded, significantly improving the confidence in the authentication process. AR authentication processes allow for more complex authentication challenges, and allow for aspects of the user authentication process to be confirmed before proceeding to higher levels of authentication.

Augmented reality is a technology that overlays virtual media, known as augmented reality objects or object mesh, on top of real objects. In the context of a user device having a camera and a display, a viewer observing the real world that the user device is capturing with its camera and displaying on its display, will also observe virtual media appearing on the display as though it is a part of the real world. The virtual media can be video, pictures, text, or any virtual image displayed in addition to the displayed real world objects, often presented as though the AR objects exist in the real world. AR also allows a user to "interact" with real-world objects displayed on the display, even in the absence of virtual media. For example, a user may observe a real-world object on the display, and interact with that object by touching the device's touch screen or by reaching into the field of view of the device's camera.

AR systems are improved by user devices having movement or location sensors such as accelerometers or GPS components, so that the virtual media can adapt to the movements of the user device, creating a stronger impression on the viewer by allowing for more realistic display of three dimensional objects. AR systems are likewise improved by the programmed ability to recognize markers, such as bar codes or quick response (QR) codes, or even real-world images like a human face, to initiate the display of virtual media in greater connection to real world objects, in a manner that is impressive to the viewer. AR systems can be programmed to be triggered by certain identifying objects or tokens, to initiate the display of virtual media.

The AR authentication systems and methods described herein may also be configured to receive user input through the camera's field of view. For example, the AR system may recognize that a user has reached into the field of view, and is using a finger or other designating item to point to objects within the field of view. In other words, the user may point to something that the camera can see, and the AR system may recognize this action by the user, and recognize that the user is selecting or otherwise designating a particular object.

For example, when a user participates in an activity requiring user authentication, on a user device having a camera and a display, the authentication process may require that the user present a user identification object to the user device. The user identification object may any object that can identify the user. In some embodiments, the user identification object is any kind of identifying card, such as a contactless credit card, a charge card, an ATM card, a store-value card, a fleet card, a payment card, an electronic cashier's check card, an access card, an identity card, a security card, or a personnel card.

The presentation of the user identification object within view of the camera of the user device may constitute a trigger to initiate the AR authentication process, including the presentation of virtual media on the display of the user device. Initiating the AR authentication process using the user identification object may increase confidence in the user's authenticity, because it is apparent that the user is in possession of the user identification object. Then, as the AR authentication proceeds, it is more likely that the holder of the user identification object is viewing, and therefore responding to, the AR authentication challenges discussed below.

AR authentication challenges provide greater flexibility in the type of authentication challenges that may be presented to a user, and a greater separation between the AR authentication challenge and the user's responses thereto. For example, while a user's conventional password may be discovered by monitoring the user's keystrokes or watching the user's physical activity, a user's response to an AR authentication challenge will be meaningless to someone monitoring the user's activity, in the absence of the AR visualization. Anyone external to the AR environment, without a view of the AR environment, will not be able to discern meaning in the user's actions or input.

In an exemplary embodiment, a method for authenticating a user may comprise storing, in a user identification database on a server, a plurality of user identifiers, each user identifier associated with a user and stored with an image of at least one associated user identification object and at least one augmented reality authentication challenge; receiving, by the server, from a user device, an authentication request including a request user identifier and a request image of a user identification object; comparing, by the server, the request user identifier and the request image of the user identification object with the user identification database; if the request user identifier and the request image of the user identification object match an entry in the user identification database, transmitting, to the user device, the augmented reality authentication challenge associated with the user identifier, configured to present at least one augmented reality object on a display of the user device; receiving, from the user device, a user response to the augmented reality authentication challenge; determining if the user response satisfies the augmented reality authentication challenge; and transmitting, by the server, an authentication approval response to the user device if the user response satisfies the augmented reality authentication challenge.

The method may further comprise transmitting, by the server, an authentication denial response to the user device if the user response does not satisfy the augmented reality authentication challenge.

The user identification object may be at least one of (i) a contactless credit card, (ii) a charge card, (iii) an ATM card, (iv) a store-value card, (v) a fleet card, (vi) a payment card, (vii) an electronic cashier's check card, (viii) an access card, (viii) an identity card, (ix) a security card or (x) a personnel card, the method further comprising modifying the augmented reality challenge based on the type of the user identification object. The user response may be at least one of (i) submitted via interaction with the augmented reality objects presented on the display of the user device, or (ii) submitted in response to the augmented reality objects presented on the display of the user device.

The method may further comprise notifying at least one of a (i) point of sale device, (ii) a merchant, or (iii) a transaction processing entity if the user response to the augmented reality authentication challenge is satisfied.

The augmented reality authentication challenge may present the at least one augmented reality object over the image of the user identification object on the display of the user device. The augmented reality authentication challenge may include information related to a previously user-provided image, or information related to previous interactions with the at least one augmented reality object. The method may further comprise sending, to the user device, instructions for interacting with the at least one augmented reality object, to be displayed on the user device. Each of the at least one augmented reality authentication challenges stored in the database may be stored with a security level identifier indicating the level of security associated with each of the at least one the augmented reality authentication challenges, and the method may further comprise selecting the augmented reality authentication challenge based on a level of security associated with the authentication request.

The method may further comprise storing each user identifier with at least two augmented reality authentication challenges. At least one of the at least two augmented reality authentication challenges may be associated with a location, and at least one of the at least two augmented reality authentication challenges may not be associated with any location. The method may further comprise receiving, by the server, from the user device, a current location of the user device. If one of the at least two augmented reality authentication challenges is associated with the received location of the user device, the method may further comprise selecting, by the server, the associated augmented reality authentication challenge. If none of the at least two augmented reality authentication challenges is associated with the received location of the user device, the method may further comprise selecting, by the server, one of the at least two augmented reality authentication challenges that is not associated with any location. The augmented reality authentication challenge transmitted to the user device may be the selected augmented reality authentication challenge.

In an exemplary embodiment, a system may comprise a computer hardware arrangement that may be configured to store, in a user identification database, a plurality of user identifiers, each user identifier associated with a user and stored with an image of at least one associated user identification object and at least one augmented reality authentication challenge; receive an authentication request including a request user identifier and a request image of a user identification object; compare the request user identifier and the request image of the user identification object with the user identification database; if the request user identifier and the request image of the user identification object match an entry in the user identification database, transmit the augmented reality authentication challenge associated with the user identifier, configured to present at least one augmented reality object on a display of the user device; receive a user response to the augmented reality authentication challenge; and transmit an authentication approval response to the user device if the user response satisfies the augmented reality authentication challenge.

The computer hardware arrangement may further be configured to receive an authentication approval response if the user response satisfies the augmented reality authentication challenge. The computer hardware arrangement may further be configured to display a message, on the user device, indicating that the augmented reality authentication challenge is satisfied. The augmented reality authentication challenge may be selected based on a level of security associated with the authentication request. The user response may be at least one of (i) submitted via interaction with the augmented reality objects presented on the display of the user device, or (ii) submitted in response to the augmented reality objects presented on the display of the user device.

The computer hardware arrangement may further be configured to store each user identifier with at least two augmented reality authentication challenges. At least one of the at least two augmented reality authentication challenges may be associated with a location, and at least one of the at least two augmented reality authentication challenges may not be associated with any location. The computer hardware arrangement may further be configured to receive a current location of the user device; if one of the at least two augmented reality authentication challenges is associated with the received location of the user device, select one of the at least two augmented reality authentication that is associated with the received location of the user device; if none of the at least two augmented reality authentication challenges is associated with the received location of the user device, select one of the at least two augmented reality authentication challenges that is not associated with any location. The augmented reality authentication challenge transmitted to the user device may be the selected augmented reality authentication challenge.

In an exemplary embodiment, a non-transitory computer-accessible medium may have stored thereon computer-executable instructions for authenticating a user, wherein, when a computer arrangement executes the instructions, the computer arrangement may be configured to perform procedures comprising capturing, by a user device having a camera, a request image of a user identification object; transmitting, by the user device, to a server, an authentication request including a request user identifier and the request image of a user identification object, wherein the server includes a user identification database storing a plurality of user identifiers, each user identifier associated with a user and stored with an image of at least one associated user identification object and at least one augmented reality authentication challenge; if the request user identifier and the request image of the user identification object match an entry in the user identification database, receiving, by the user device, the augmented reality authentication challenge associated with the user identifier, configured to present at least one augmented reality object on a display of the user device; presenting the augmented reality authentication challenge on the display of the user device, including the at least one augmented reality object; receiving a user response to the augmented reality authentication challenge from the user; transmitting the user response to the server; and receiving, from the server, an authentication approval response if the user response satisfies the augmented reality authentication challenge.

The augmented reality authentication challenge may present at least one augmented reality object on the display of the user device. The user response may be at least one of (i) submitted via interaction with the augmented reality objects presented on the display of the user device, or (ii) submitted in response to the augmented reality objects presented on the display of the user device. The user response may include selecting one or more of the augmented reality objects that meet a predefined criteria.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Figure 1:
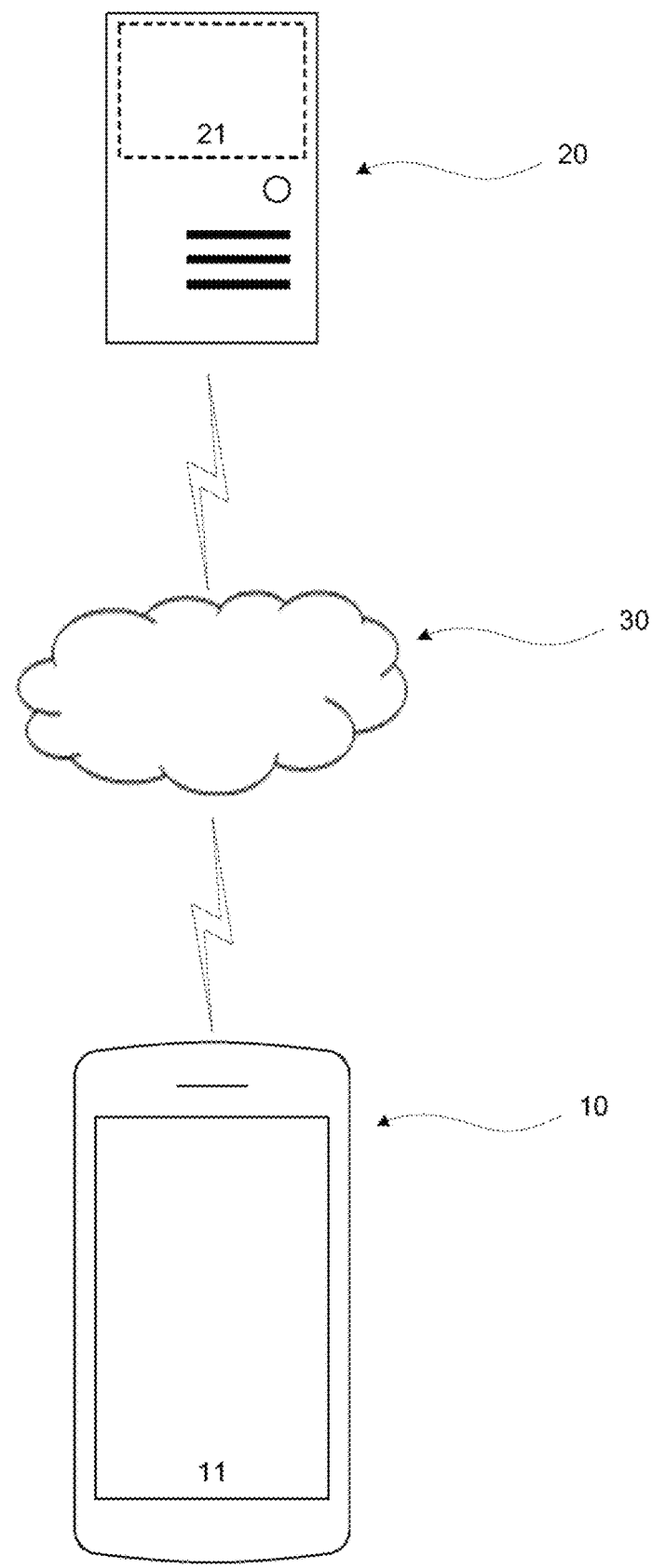
FIG. 1 is an illustration of a system for augmented reality authentication of a user, in accordance with an example embodiment of the present invention.

An exemplary embodiment of the overall system of the present invention is illustrated in FIG. 1. User device 10 may be any known mobile device, such as a smartphone, personal digital assistant, tablet computer, wearable device such as a smartwatch, smart glasses, or head mounted display, or the like. User device 10 includes a computing device capable of communicating with server 20, which includes local communication with a local device for communicating with server 20. User device 10 includes user input and computing components generally known to mobile computing devices, including display 11, suitable computing components for processing and executing mobile applications and associated software, suitable components for receiving user input such as a keyboard, touch screen, or microphone, and known suitable components for communicating with a remote server on a network 30, such as via the Internet. The computing components of user device 10, including memory and processors, may be used to store and execute mobile applications, as well as programs for receiving input from users and from remote computing devices, such as servers. Further, memory may be used to store information collected by the mobile applications from user input. Further still, user device 10 may include components for detecting the movement of the user device, such as accelerometers, and components for determining the location of the user device, such as global positioning systems, to improve the functionality of the systems and methods described herein. User device 10 may also determine its location by its access to local networks, such as a wireless connect to a local Wi-Fi network or Bluetooth connections to known devices.

At least some portion of the systems and methods described as being carried out by the user device may be divided among user devices carried by the user. For example, if the user is carrying one device communicating with a remote server (such as a smartphone), and a separate device for capturing images of user identification objects or other real world objects and displaying AR objects (such as a wearable computing device), the two user devices of the user may coordinate to carry out the invention. User device may further be communicating with the network 30 and server 20 via known intermediary devices (such as routers) and still be within the scope of the systems and methods described herein.

Server 20 may be located remote from the user device, and includes a user identification database 21, processing components, and components for communicating with user devices on a network 30, such as via the Internet. These components of the server 20 may be used to process and evaluate received information, to store information relating to users, and to communicate with user devices running mobile applications regarding the stored user information.

The computer processing functions described herein can be carried out on the server 20 or on user device 10. Running programs locally on user device 10 may permit the program to run more quickly, if user device 10 has sufficient processing capabilities, because of the reduced need to communicate with server 20. Alternatively, running programs on server 20 would avoid processing limitations that may be experienced on user device 10.

Figure 2:
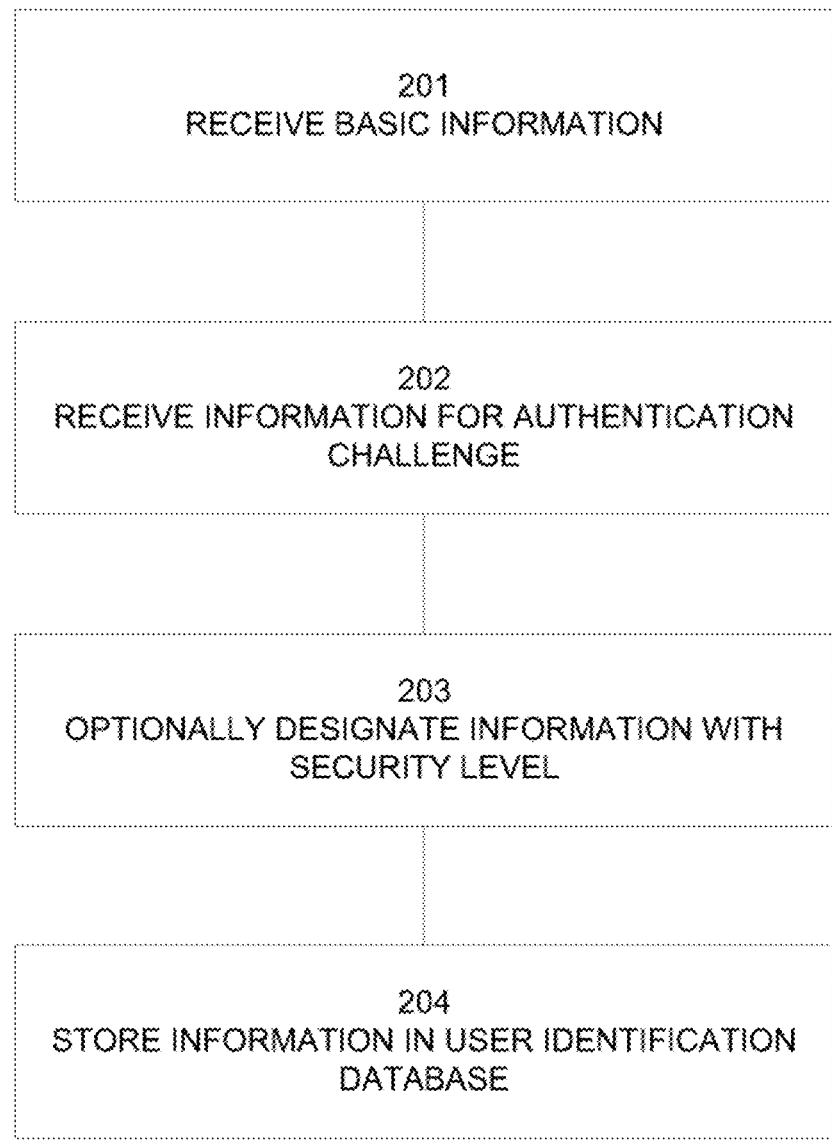
FIG. 2 is a flowchart illustrating a method for augmented reality authentication of a user, in accordance with an example embodiment of the present invention.

In an exemplary embodiment, the user will participate in the registration process illustrated in FIG. 2. In Step 201 of the registration process, basic information is obtained from the user, and submitted to the server 20, to be stored in the user identification database 21. This information may, for example, include the user's name, date of birth, social security number, or other information sufficient to identify the user.

In Step 202, additional information is obtained from the user, which will form the basis for the authentication challenges described herein. This information may include, for example, a password, answers to personal questions more likely to be known only to the user, or background information such as the user's prior mailing addresses or places of employment. This information may be object-based. For example, the user may be asked to designate one of several available objects to be the subject of an authentication challenge, or the user may be asked to upload an image of an object to be used in this way. As a further example, the user may be asked to observe several displayed objects, and set a particular order for the display of those objects. As a further example, the user may be asked to set a criteria for selecting certain objects from a group of objects. This criteria may include identifying all of the objects that are displayed in a certain color, or that are described by words beginning with a certain letter, or that show places where the user has previously lived.

As a further example, the information used in the AR authentication challenge may utilize the user's real-world environment. The user may designate real-world objects found in a particular location, such as the user's home, or any place where the user expects to be when responding to the authentication challenges, and those objects may be the subject of AR authentication challenges in which the user is asked to identify the previously designated objects. The user may set a criteria for any collection of real-world objects that may be viewed in the user's real-world environment, so that the later AR authentication challenge requires the user to designate any real-world objects meeting the criteria. For example, the criteria may include any real-world objects appearing on the user's desk that are blue in color. Or the user may set a sequence in which real-world objects must be selected: for example, the user may set the authentication challenge to require the user to touch the desk, then the chair, then the notepad, in that order. As a further example, the nature of the user's interaction with the real-world object may be set: the user may touch the object, push the object, pick up the object, put down the object, or the like.

Reliance on the user's real-world environment may be based on a determination that the user is located within a known location, such as the user's home. For example, if the information user in the AR authentication challenge is based on certain real-world objects in the user's home, that information may be associated in the database with reference data for determining whether the user is at home, such as GPS coordinates, geotagging information, connections to known local networks, or the like.

This list of exemplary information for use in authentication challenges is not intended to be limiting, and the user may be asked to submit one type of information, or several different types of information.

Moreover, in Step 203, the user may be asked to associate each the different types of information with a level of security. For example, the user may designate certain answers to personal questions or background information as having a low level of security, if that information is considered to be less secure or more available to others. As a further example, images of objects in the user's home, complex password, or a complex reordering of displayed objects may be designated with a higher level of security. The information may be sorted into classifications, with each classification associated with a level of security. The levels of security may be used to determine which information is applied to a particular authentication challenge, depending on the activity in which that the requesting user is attempting to participate.

In Step 204, the information obtained from the user is stored in the user identification database 21 on server 20. In the database, each entry is associated with a user. The user can be associated with an entry by the user's name or other personal information, or a user identifier may be generated to associate a particular user with their entry in the database.

Figure 3:
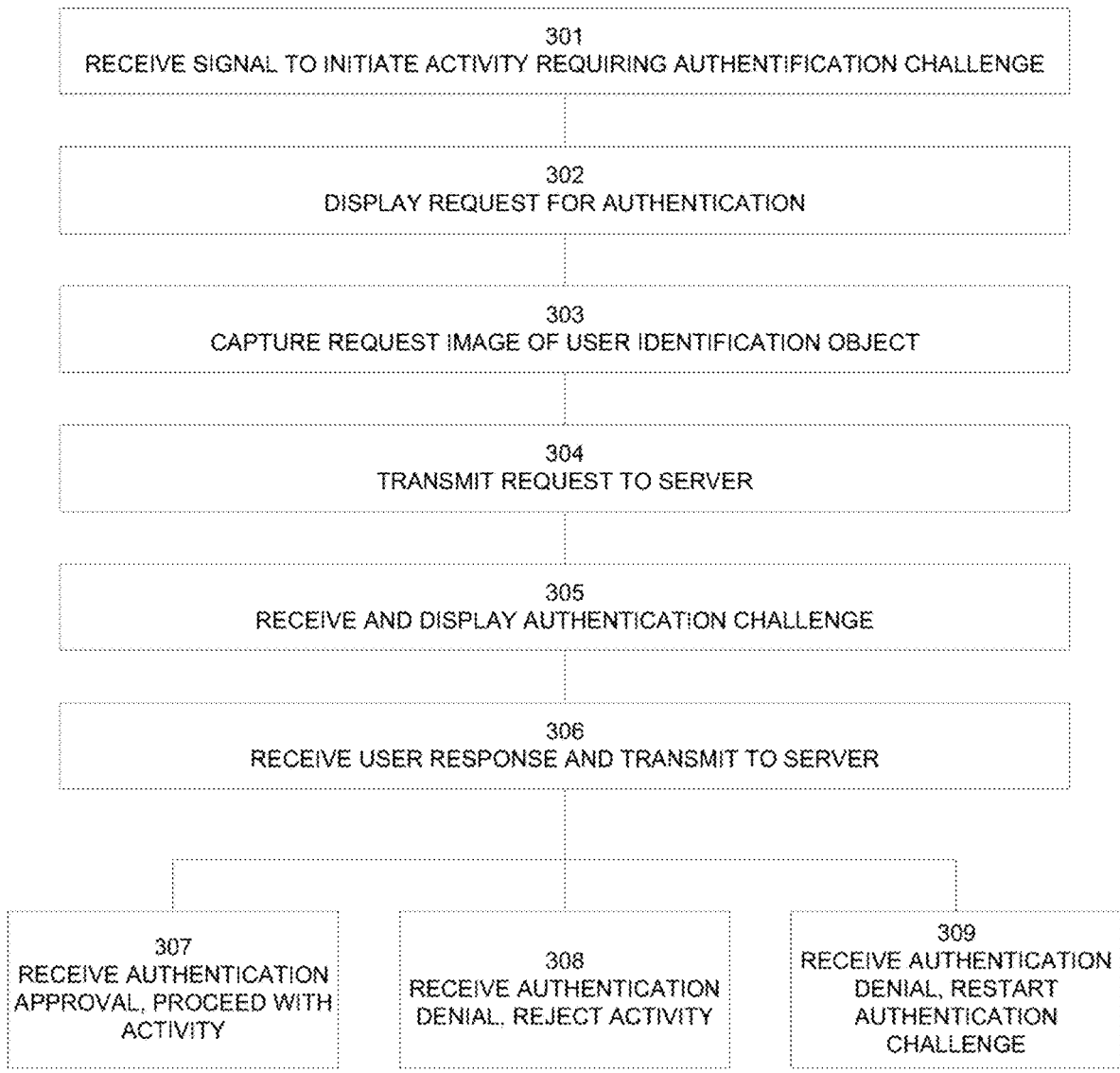
FIG. 3 is a flowchart illustrating a method for augmented reality authentication of a user, in accordance with an example embodiment of the present invention.

In an exemplary embodiment, as illustrated in FIG. 3, the authentication challenge is presented on user device 10. In Step 301, user device 10 receives an indication that a user is initiating an activity that requires a security challenge. This may apply to a wide variety of user activities, and can be determined in advance. For example, if a user attempts to access a private account, provide assets to another party, acquire assets from another party, exchange assets with another party, make a payment, or register for some type of service, the initiation of such activities may be configured to require the satisfaction of an authentication challenge before proceeding with the activity.

A software module may be stored and executed either from user device 10 or server 20, and first determines whether authentication is required for the indicated user activity. This may be provided as a lookup procedure, or a call to stored information or other list to see if the initiated activity is among those designated to require an authentication procedure. An authentication procedure may also be built directly into the software process that the user is attempting to access. If authentication is required, the procedure will determine whether proper authentication has already been attributed to this user, and if not, will initiate the authentication procedure. A computing component, such as a processor, of the user device 10, in response to the determination that the user's activity requires authentication, executes the authentication procedure.

In Step 302, user device 10 displays a request for authentication. If the user is not authenticated, the processor, in connection with a graphics module of user device 10, presents a request for authentication on the display 11 of user device 10. The request for authentication may require the user to present a user identification object, to continue to the next stages of the authentication procedure. The request may be presented with specific instructions to present the user identification object, to continue with the authentication procedure. Alternatively, the request may be presented without instruction, under the assumption that the proper user is already aware of the required actions. The display may designate an area in the field of view of the camera of user device 10 for the user identification object to be presented, which can assist the system in recognizing the user identification object.

In Step 303, after the user directs the camera of user device 10 to the user identification object, user device 10 captures an image of the user identification object, referred to as the "request image." The request image may be a still picture, or may be video, which may help to capture the user identification object in greater detail or from better views to assist the system in properly recognizing the user identification object. User device 10 may require the user to input a command for the camera to capture the request image (i.e., may require a user to take the picture), or user device 10 may be configured to determine when the user identification object is within view of the camera and automatically capture the request image.

In Step 304, user device 10 transmits an authentication request to server 20. The request includes a request user identifier and the request image of the user identification object. The request user identifier may be any indication of intended user. User device 10 may have the request user identifier based on the attempted use of a user's account, either because the user identifier was previously stored on user device 10, or because it was entered by the user when the user attempted to initiate the activity. The request may also include information identifying the current location of the device.

The captured image of the user identification object may be stored in memory on user device 10, even if only temporarily, with the request user identifier. The combined request image and request identifier are communicated to server 20 over network 30, where processing components on server 20 receive the request image and request user identifier. Server 20 interrogates user authentication database 21 to determine whether the database includes an entry associated with the request user identifier, and if so, whether that request user identifier is stored with an image matching the request image. Matching the request image to a stored image may be carried out by any known image recognition techniques, character recognition techniques, bar code or quick response (QR) code technology, or the like. Requiring a matched image of the user identification object to trigger the AR authentication challenge increases confidence in the authentication procedure. A match demonstrates that the user is in possession of the correct user identification object, and is eligible to proceed to the next authentication steps.

If a match is found, server 20 further interrogates the database for an AR authentication challenge stored in association with the user identifier and the image of the user identification object, and selects one of the stored AR authentication challenges. If there is a level of security associated with the user's activity, then an authentication challenge having the relevant security level is selected. As another example, a level of security may be associated with the particular user identification object that was used to initiate the authentication procedure, so that the presentation of, e.g., a credit card may dictate a different authentication challenge associated with a different level of security than a security card. If it has been determined that the device is located within a known location for the user, such as the user's home, that may dictate that a certain AR authentication challenge is selected. For example, if the user is at home, then an AR challenge based on objects within the user's home may be selected; if the user is away from home, then another option may be selected. Server 20 then transmits the AR authentication challenge to user device 10. The transmitted AR authentication challenge may include any data required to allow user device 10 to present the AR authentication challenge, such as scene information describing how to change the AR environment, information indicating whether one or more user input devices (keyboard, touchscreen, microphone, camera) will be necessary for receiving the user's response, information identifying what AR objects to display, and the like.

In Step 305, user device 10 receives and displays an AR authentication challenge. User device 10 receives a response from server 20, which includes the selected authentication challenge that was associated with the user's stored information in user identification database 21. A processor in user device 10 extracts the AR authentication challenge from the data received from server 20, and, in connection with a graphics module of user device 10, presents the AR authentication challenge on the display 11 of user device 10.

Figure 5:
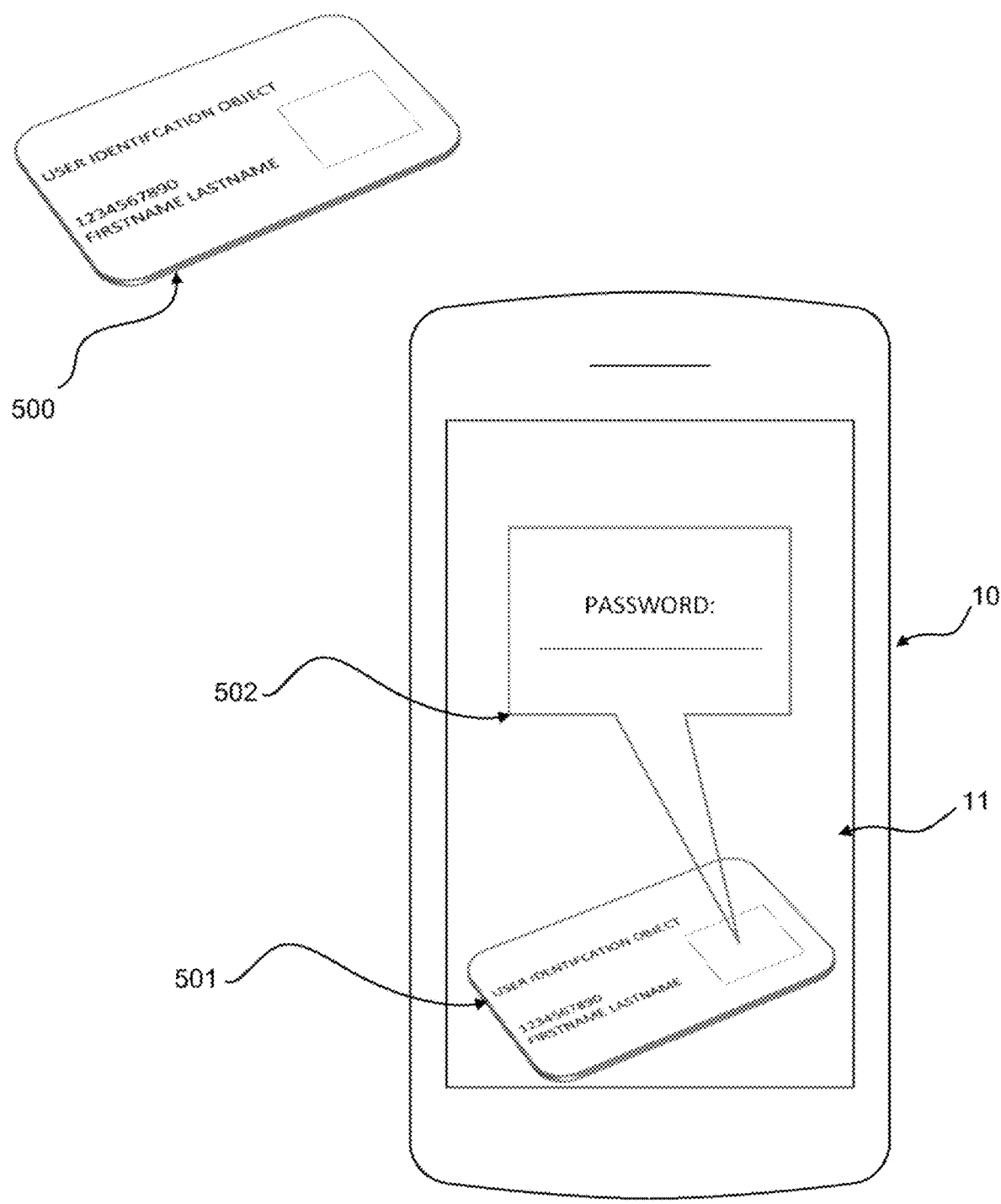
FIG. 5 is an illustration of a system for augmented reality authentication of a user, in accordance with an example embodiment of the present invention.

The AR authentication challenge can take a variety of forms. In one example, a request for information may be presented in a manner that it appears to be floating in space about the user identification object. An example of this is illustrated in FIG. 5, including user device 10, display 11, user identification object 500, image of user identification object 501, and AR object 502. As illustrated in FIG. 5, user device 10 has directed its camera at user identification object 500, and is displaying the image of user identification object 501 on display 11 of user device 10. AR object 502 presents a request for a user's password. A similar display may be presented for other information associated with the user. The user may submit a response by entering the response directly via suitable components for receiving user input such as a keyboard, touch screen, or microphone.

Figure 6:
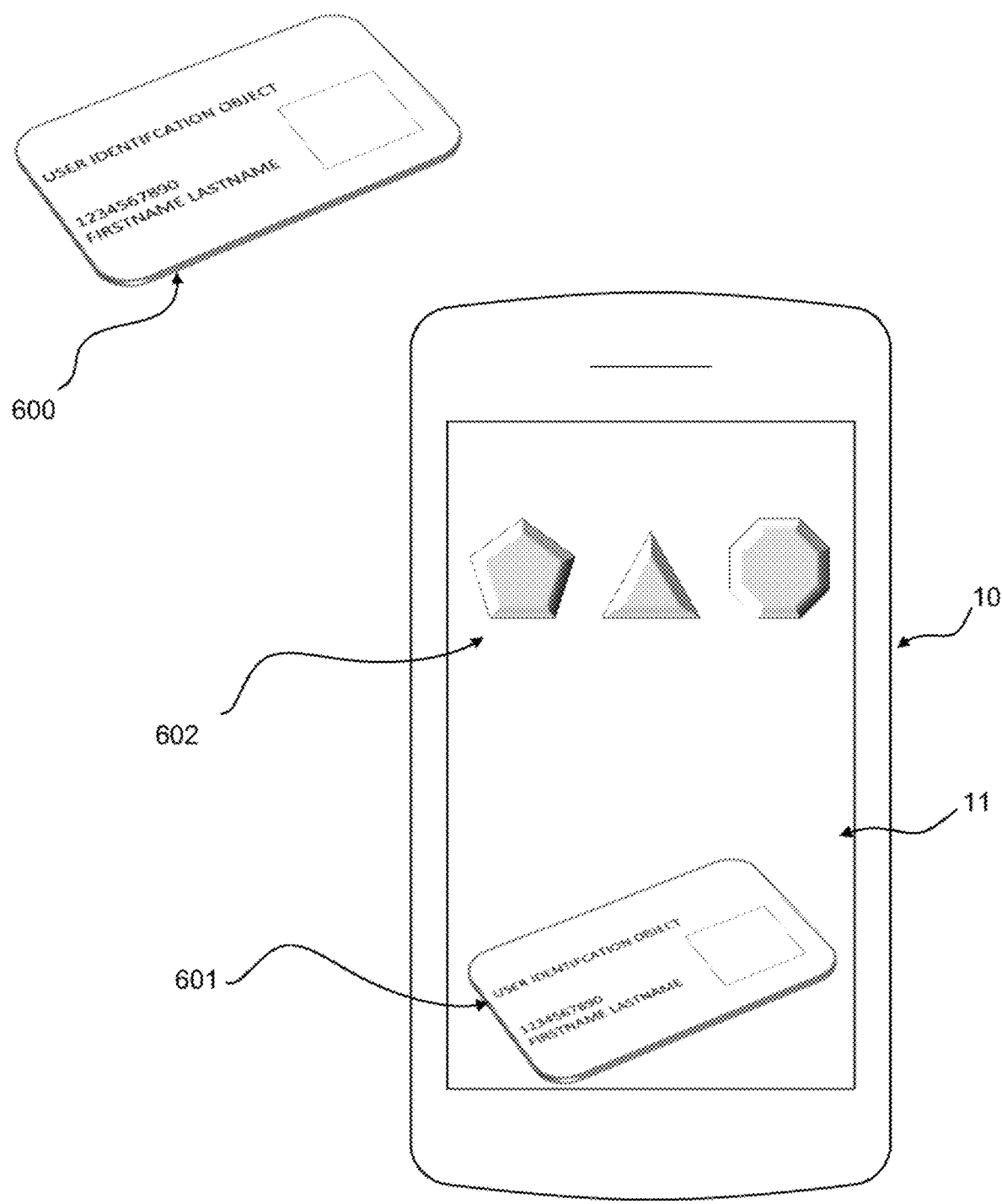
FIG. 6 is an illustration of a system for augmented reality authentication of a user, in accordance with an example embodiment of the present invention.

Another example of an AR authentication challenge is illustrated in FIG. 6, including user device 10, display 11, user identification object 600, image of user identification object 601, and AR objects 602. In an example embodiment illustrated in FIG. 6, the AR authentication challenge requires the user to select one or more of a plurality of objects according to the pre-selected image(s) stored by the user during the registration process of FIG. 2. In another example embodiment illustrated in FIG. 6, the AR authentication challenge requires the user to arrange the AR objects 602 according to the pre-set arrangement stored by the user during the registration process of FIG. 2. In another example embodiment illustrated in FIG. 6, the AR authentication challenge requires the user to select one or more of a plurality of objects, according to the pre-set criteria stored by the user during the registration process of FIG. 2; for example, the user may be required to select three objects that are blue in color, without a prompt being displayed to clarify the correct selection. In each of these examples associated with FIG. 6, the user may submit a response by entering the response directly via suitable components for receiving user input such as a keyboard, touch screen, or microphone, or by reaching into the field of view of the camera of user device 10 to point to, modify, or otherwise designate, one or more objects being displayed in augmented reality.

Figure 7:
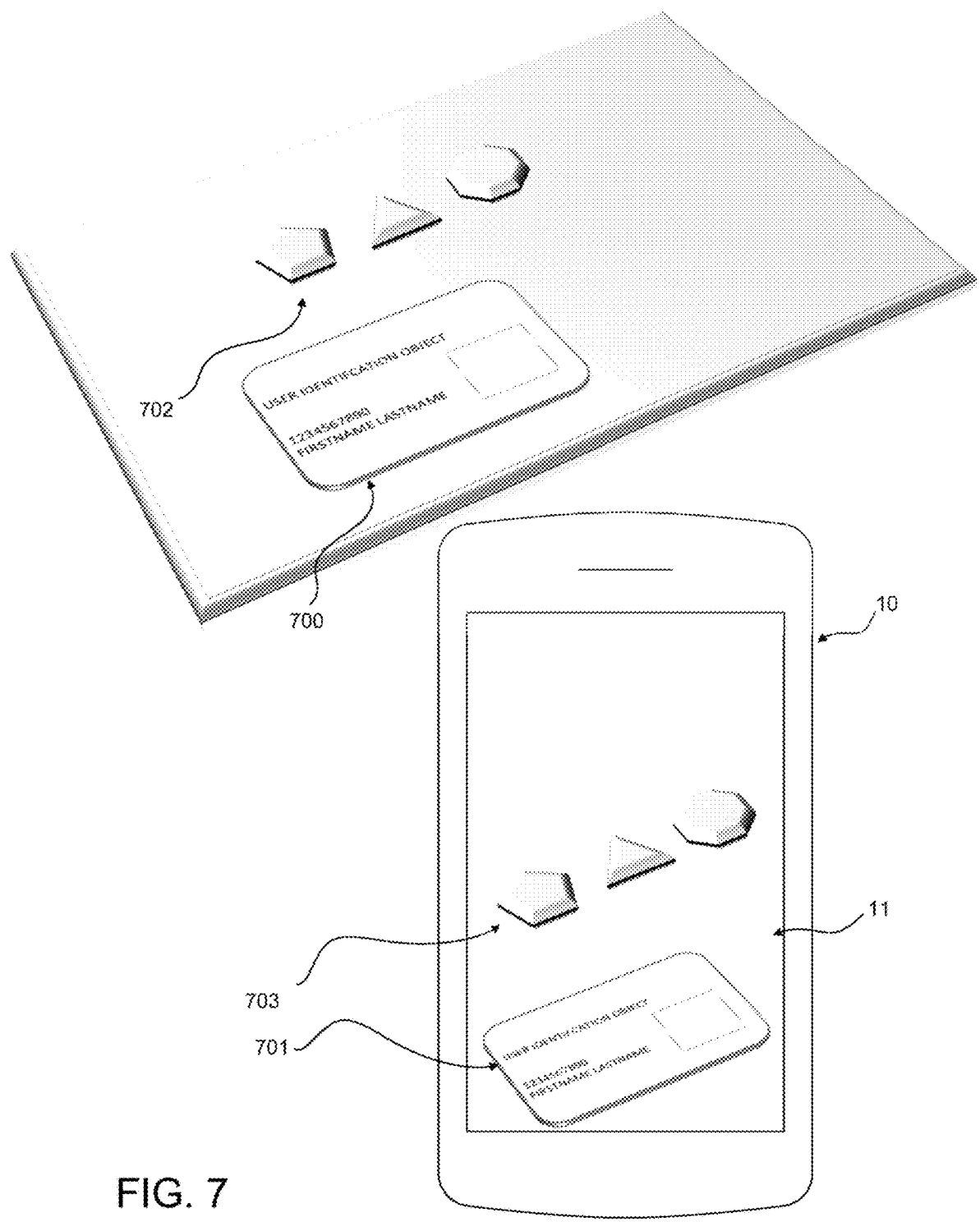
FIG. 7 is an illustration of a system for augmented reality authentication of a user, in accordance with an example embodiment of the present invention.

Another example of AR authentication challenge is illustrated in FIG. 7, including user device 10, display 11, user identification object 700, image of user identification object 701, real-world objects 702, and images of real-world objects 703. In this example, the AR authentication challenge requires the user to select one or more of the plurality of real-world objects 702, according to the pre-set objects or criteria identified and stored by the user during the registration process of FIG. 2. In this example associated with FIG. 7, the user may submit a response by entering the response directly via suitable components for receiving user input such as a keyboard, touch screen, or microphone to select one or more of the images of real world objects 703, or by reaching into the field of view of the camera of user device 10 to point to, modify, or otherwise designate, one or more real-word objects 702. In this example, these objects provide additional confidence in the authenticity of the user, because these objects may be more likely to be found at a specific location unique to the user, such as the user's home.

The AR authentication challenge illustrated in FIG. 7 may also be based on the location of the user's device. If user device 10 is determined to be located within the user's home, then an AR authentication challenge may be selected that is based on real-world objects appearing in the user's home, such as a challenge requiring the user to select a series of known objects in a particular order. If user device 10 is determined to be located away from a known location, then an AR authentication challenge may be selected that is based on any available real-world objects, such as a challenge requiring the user to identify all blue-colored objects.

Returning to FIG. 3, in Step 306, user device 10 receives the user's response to the AR authentication challenge, and transmits the response to server 20. Once server 20 receives the response, the processing components of server 20 compares the response to the stored information in user identification database 21. This comparison may include a comparison of submitted text to the text stored in user identification database 21, a comparison of selected images to images stored in user identification database 21, or other data useful in identifying the correct response. For example, displayed objects may be associated with an object identifier or object ID, and the object ID associated with the object may be compared to the stored object ID. As a further example, if the AR authentication challenge is based on a selection of real-world objects within a room, the comparison may use images of the selected object compared with stored images of the selected object, or the comparison may rely on location of the objects within the room, possibly using a set of coordinates referenced to the room or observable environment. In this manner, the entire observable room may be, in effect, converted to a digital environment, transmitted to server 20, and evaluated to determine which objects were or were not designated by the user in response to the AR authentication challenge, and whether those objects satisfy the AR authentication challenge. As a further example, the order in which the viewed objects are organized may constitute the basis for the comparison, or the nature of the user's interaction with the object, such as picking up or putting down the object.

This comparison may be flexible, so that the response need not be identical to the stored information to satisfy the authentication challenge. Similarly, a flexible comparison may permit various levels of satisfaction of the authentication challenge, and allow an appropriate response, such as a request for an additional authentication challenge, in lieu of an outright denial of authentication.

Following the comparison of the user's response to the stored information in user authentication database 21, depending on the results of the comparison, server 20 transmits an authentication approval or denial. In FIG. 3, three alternative response may be received from server 20.

In Step 307, user device 10 receives an authentication approval from server 20, indicating that the AR authentication challenge was satisfied. In this alternative, the user is determined to be authentic, and is permitted to proceed with the activity.

Alternatively, in Step 308, user device 10 receives an authentication denial from server 20, indicating that the AR authentication challenge was not satisfied. In this alternative, the user is not determined to be authentic, and is denied permission to proceed with the activity.

In yet another alternative, in Step 309, user device 10 receives an authentication denial from server 20, indicating that the AR authentication challenge was not satisfied, and further receives a request to initiate an additional AR authentication challenge. In this alternative, the user is not determined to be authentic, but is given an additional opportunity to demonstrate the user's authenticity. For example, the authentication procedure may allow for one or more unsatisfied AR authentication challenges before ultimately denying the user access to the activity. As a further example, the authentication procedure may determine that the user's response was not sufficient to satisfy the AR authentication challenge, but was sufficient to warrant additional AR authentication challenges. For example, if a user was asked to reorder a set of five AR objects in a particular sequence, and misplaced one of the AR objects, that response may be deemed sufficient to avoid an outright denial, but will require additional satisfactory responses to further AR authentication challenges. Similarly, the AR authentication challenge may require that the user sufficiently response to more than one AR authentication challenge before being deemed authentic, and permitted to proceed with the activity.

Figure 4:
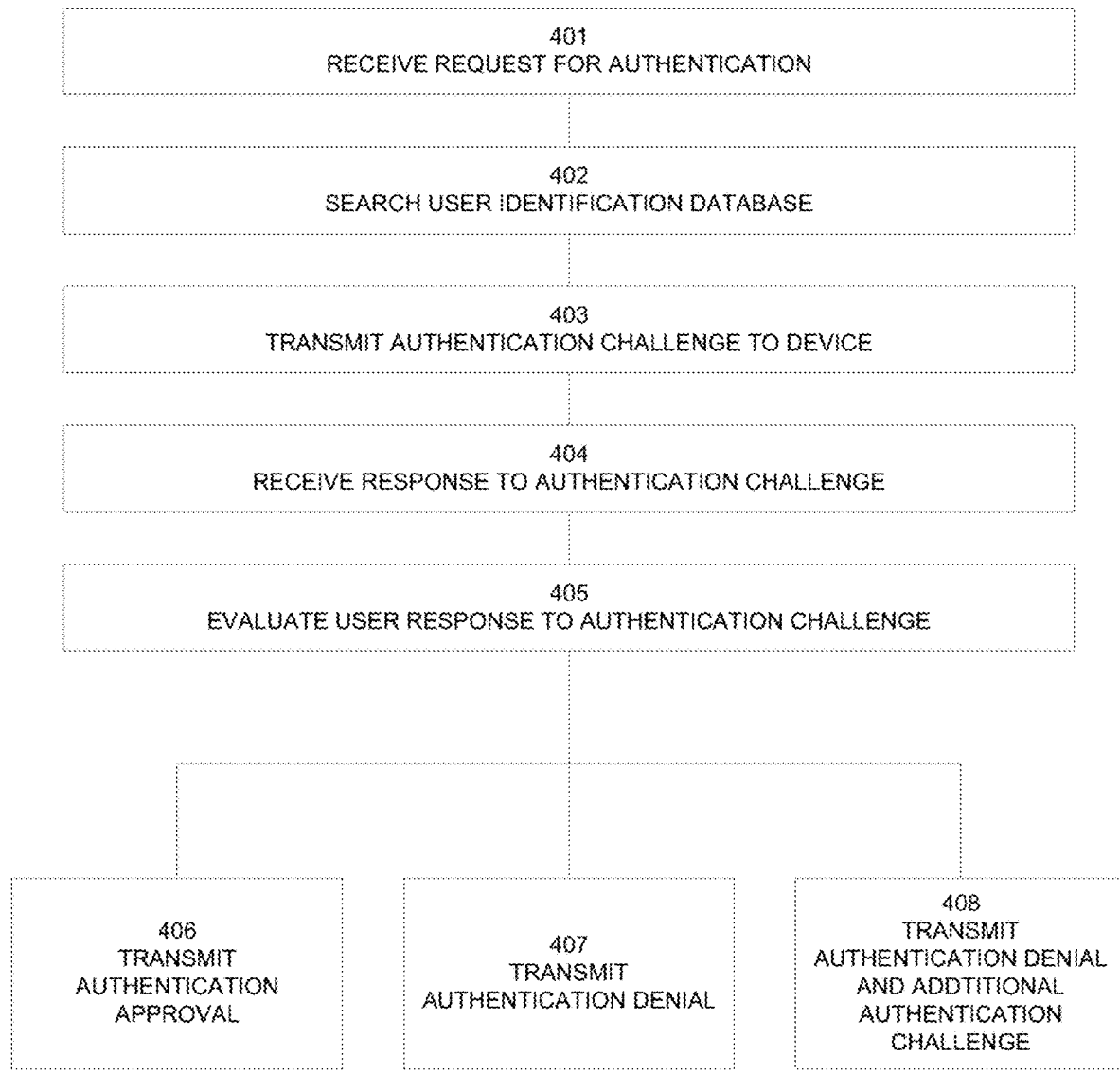
FIG. 4 is a flowchart illustrating a method for augmented reality authentication of a user, in accordance with an example embodiment of the present invention.

In an exemplary embodiment, as illustrated in FIG. 4, the authentication challenge is transmitted to user device 10, and the response is received and evaluated by server 20. In Step 201, server 20 receives a request for authentication from user device 10. The request includes the request user identifier and the request image of the user identification object.

In Step 402, processing components on server 20 receive the request image and request user identifier. Server 20 interrogates user authentication database 21 to determine whether the database includes an entry associated with the request user identifier, and if so, whether that request user identifier is stored with an image matching the request image. Matching the request image to a stored image may be carried out by any known image recognition techniques, character recognition techniques, bar code or quick response (QR) code technology, or the like. Requiring a matched image of the user identification object to trigger the AR authentication challenge increases confidence in the authentication procedure. A match demonstrates that the user is in possession of the correct user identification object, and is eligible to proceed to the next authentication steps.

In Step 403, if a match is found, server 20 further interrogates the database for an AR authentication challenge stored in association with the user identifier and the image of the user identification object, and selects one of the stored AR authentication challenges. If there is a level of security associated with the user's activity, then an authentication challenge having the relevant security level is selected. Server 20 then transmits the AR authentication challenge to user device 10. User device 10 then displays the AR authentication challenge to the user, receives the user's response to the challenge, and transmits the user's response to server 20 for evaluation.

In Step 404, server 20 receives the user's response to the AR authentication challenge, and, in Step 405, processing components of server 20 evaluate the user's response, comparing the response to the stored information in user identification database 21. This comparison may include a comparison of submitted text to the text stored in user identification database 21, or a comparison of selected images to images stored in user identification database 21. This comparison may include a comparison of submitted text to the text stored in user identification database 21, a comparison of selected images to images stored in user identification database 21, or other data useful in identifying the correct response. For example, displayed objects may be associated with an object identifier or object ID, and the object ID associated with the object may be compared to the stored object ID. As a further example, if the AR authentication challenge is based on a selection of real-world objects within a room, the comparison may use images of the selected object compared with stored images of the selected object, or the comparison may rely on location of the objects within the room, possibly using a set of coordinates referenced to the room or observable environment. In this manner, the entire observable room may be, in effect, converted to a digital environment, transmitted to server 20, and evaluated to determine which objects were or were not designated by the user in response to the AR authentication challenge, and whether those objects satisfy the AR authentication challenge. As a further example, the order in which the viewed objects are organized may constitute the basis for the comparison, or the nature of the user's interaction with the object, such as picking up or putting down the object.

This comparison may be flexible, so that the response need not be identical to the stored information to satisfy the authentication challenge. Similarly, a flexible comparison may permit various levels of satisfaction of the authentication challenge, and allow an appropriate response, such as a request for an additional authentication challenge in lieu of an outright denial of authentication.

As a result of the evaluation, server 20 may transmit one of three alternative responses to user device 10.

In Step 406, server 20 determines that the AR authentication challenge was satisfied, and transmits an authentication approval to user device 10. In this alternative, the user is determined to be authentic, and is permitted to proceed with the activity.

Alternatively, in Step 407, server 20 determines that the AR authentication was not satisfied, and transmits an authentication denial to user device 10. In this alternative, the user is not determined to be authentic, and is denied permission to proceed with the activity.

In yet another alternative, in Step 408, server 20 determines that the AR authentication was not satisfied, and transmits an authentication denial to user device 10, along with a request to initiate an additional AR authentication challenge. In this alternative, the user is not determined to be authentic, but is given an additional opportunity to demonstrate the user's authenticity. For example, the authentication procedure may allow for one or more unsatisfied AR authentication challenges before ultimately denying the user access to the activity. As a further example, the authentication procedure may determine that the user's response was not sufficient to satisfy the AR authentication challenge, but was sufficient to warrant additional AR authentication challenges. For example, if a user was asked to reorder a set of five AR objects in a particular sequence, and misplaced one of the AR objects, that response may be deemed sufficient to avoid an outright denial, but will require additional satisfactory responses to further AR authentication challenges. Similarly, the AR authentication challenge may require that the user sufficiently respond to more than one AR authentication challenge before being deemed authentic, and permitted to proceed with the activity.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A method for authenticating a user, comprising:
storing, in a user identification database on a server, a plurality of user identifiers, each user identifier associated with a user and stored with an image of at least one associated user identification object and at least one augmented reality authentication challenge;
receiving, by the server, from a user device, an authentication request including a request user identifier and a request image of a user identification object;
comparing, by the server, the request user identifier and the request image of the user identification object with the user identification database;
if the request user identifier and the request image of the user identification object match an entry in the user identification database, transmitting, to the user device, an augmented reality authentication challenge associated with the user identifier, the challenge configured to present at least one augmented reality object on a display of the user device;
receiving, from the user device, a user response to the augmented reality authentication challenge;
determining if the user response satisfies the augmented reality authentication challenge; and
transmitting, by the server, an authentication approval response to the user device if the user response satisfies the augmented reality authentication challenge.

2. The method of claim 1, further comprising transmitting, by the server, an authentication denial response to the user device if the user response does not satisfy the augmented reality authentication challenge.

3. The method of claim 1, wherein the user identification object is at least one of (i) a contactless credit card, (ii) a charge card, (iii) an ATM card, (iv) a store-value card, (v) a fleet card, (vi) a payment card, (vii) an electronic cashier's check card, (viii) an access card, (viii) an identity card, (ix) a security card or (x) a personnel card, the method further comprising modifying the augmented reality challenge based on the type of the user identification object.

4. The method of claim 1, wherein the user response is at least one of (i) submitted via interaction with the augmented reality objects presented on the display of the user device, or (ii) submitted in response to the augmented reality objects presented on the display of the user device.

5. The method of claim 1, further comprising notifying at least one of a (i) point of sale device, (ii) a merchant, or (iii) a transaction processing entity if the user response to the augmented reality authentication challenge is satisfied.

6. The method of claim 1, wherein the augmented reality authentication challenge presents the at least one augmented reality object over the image of the user identification object on the display of the user device.

7. The method of claim 6, wherein the augmented reality authentication challenge includes information related to a previously user-provided image.

8. The method of claim 6, wherein the augmented reality authentication challenge includes information related to previous interactions with the at least one augmented reality object.

9. The method of claim 6, further comprising sending, to the user device, instructions for interacting with the at least one augmented reality object, to be displayed on the user device.

10. The method of claim 6, wherein each of the at least one augmented reality authentication challenges stored in the database is stored with a security level identifier indicating the level of security associated with each of the at least one the augmented reality authentication challenges, the method further comprising selecting the augmented reality authentication challenge based on a level of security associated with the authentication request.

11. The method of claim 1, further comprising:
    storing each user identifier with at least two augmented reality authentication challenges, wherein at least one of the at least two augmented reality authentication challenges is associated with a location, and at least one of the at least two augmented reality authentication challenges is not associated with any location;
    receiving, by the server, from the user device, a current location of the user device;
    if one of the at least two augmented reality authentication challenges is associated with the received location of the user device, selecting, by the server, the associated augmented reality authentication challenge;
    if none of the at least two augmented reality authentication challenges is associated with the received location of the user device, selecting, by the server, one of the at least two augmented reality authentication challenges that is not associated with any location;
    wherein the augmented reality authentication challenge transmitted to the user device is the selected augmented reality authentication challenge.

12. A system, comprising:
    a computer hardware arrangement configured to:
        store, in a user identification database, a plurality of user identifiers, each user identifier associated with a user and stored with an image of at least one associated user identification object and at least one augmented reality authentication challenge;
        receive an authentication request including a request user identifier and a request image of a user identification object;
        compare the request user identifier and the request image of the user identification object with the user identification database;
        if the request user identifier and the request image of the user identification object match an entry in the user identification database, transmit an augmented reality authentication challenge associated with the user identifier, the challenge configured to present at least one augmented reality object on a display of the user device;
        receive a user response to the augmented reality authentication challenge; and
        transmit an authentication approval response to the user device if the user response satisfies the augmented reality authentication challenge.

13. The system of claim 12, wherein the computer hardware arrangement is further configured to receive an authentication approval response if the user response satisfies the augmented reality authentication challenge.

14. The system of claim 13, wherein the computer hardware arrangement is further configured to display a message, on the user device, indicating that the augmented reality authentication challenge is satisfied.

15. The system of claim 12, wherein the augmented reality authentication challenge is selected based on a level of security associated with the authentication request.

16. The system of claim 12, wherein the user response is at least one of (i) submitted via interaction with the augmented reality objects presented on the display of the user device, or (ii) submitted in response to the augmented reality objects presented on the display of the user device.

17. The system of claim 12, wherein the computer hardware arrangement is further configured to:
    store each user identifier with at least two augmented reality authentication challenges, wherein at least one of the at least two augmented reality authentication challenges is associated with a location, and at least one of the at least two augmented reality authentication challenges is not associated with any location;
    receive a current location of the user device;
    if one of the at least two augmented reality authentication challenges is associated with the received location of the user device, select one of the at least two augmented reality authentication challenges that is associated with the received location of the user device;
    if none of the at least two augmented reality authentication challenges is associated with the received location of the user device, select one of the at least two augmented reality authentication challenges that is not associated with any location;
    wherein the augmented reality authentication challenge transmitted to the user device is the selected augmented reality authentication challenge.

18. A non-transitory computer-accessible medium having stored thereon computer-executable instructions for authenticating a user, wherein, when a computer arrangement executes the instructions, the computer arrangement is configured to perform procedures comprising:
    capturing, by a user device having a camera, a request image of a user identification object;
    transmitting, by the user device, to a server, an authentication request including a request user identifier and the request image of a user identification object, wherein the server includes a user identification database storing a plurality of user identifiers, each user identifier associated with a user and stored with an image of at least one associated user identification object and at least one augmented reality authentication challenge;
    if the request user identifier and the request image of the user identification object match an entry in the user identification database, receiving, by the user device, an augmented reality authentication challenge associated with the user identifier, the challenge configured to present at least one augmented reality object on a display of the user device;
    presenting the augmented reality authentication challenge on the display of the user device, including the at least one augmented reality object;
    receiving a user response to the augmented reality authentication challenge from the user;
    transmitting the user response to the server; and receiving, from the server, an authentication approval response if the user response satisfies the augmented reality authentication challenge.

19. The non-transitory computer-accessible medium of claim 18, wherein the augmented reality authentication challenge presents at least one augmented reality object on the display of the user device, and wherein the user response is at least one of (i) submitted via interaction with the augmented reality objects presented on the display of the user device, or (ii) submitted in response to the augmented reality objects presented on the display of the user device.

20. The non-transitory computer-accessible medium of claim 19, wherein the user response includes selecting one or more of the augmented reality objects that meet a pre-defined criteria.

* * * * *